United States Patent [19]
Kenny et al.

[11] Patent Number: 6,029,535
[45] Date of Patent: Feb. 29, 2000

[54] HIGHWAY TRACTOR GEAR SHIFT

[75] Inventors: David L. Kenny, Greensboro, N.C.; William Gremminger, Virginia Beach, Va.

[73] Assignee: Volvo Trucks North America, Inc., Greensboro, N.C.

[21] Appl. No.: 09/150,862

[22] Filed: Sep. 10, 1998

[51] Int. Cl.[7] .............................. B60K 20/00; G05G 1/04
[52] U.S. Cl. ........................... 74/473.3; 74/524; 403/349
[58] Field of Search ................................... 403/348, 349; 74/473.3, 524

[56] References Cited

U.S. PATENT DOCUMENTS

| | | |
|---|---|---|
| 1,059,884 | 4/1913 | Link . |
| 1,156,272 | 10/1915 | Cass . |
| 1,283,852 | 11/1918 | Mellin . |
| 1,301,475 | 4/1919 | Mellin . |
| 1,719,368 | 7/1929 | Hibbets . |
| 1,743,241 | 1/1930 | Schmidt . |
| 1,908,423 | 5/1933 | Hjermstad . |
| 2,334,057 | 11/1943 | Ashton et al. . |
| 3,329,229 | 7/1967 | Mukho . |
| 3,423,781 | 1/1969 | Henson ................................... 403/349 |
| 4,073,199 | 2/1978 | Simons ................................... 74/473.3 |
| 4,281,526 | 8/1981 | Lipschutz . |
| 4,515,029 | 5/1985 | Reynolds et al. . |
| 4,823,635 | 4/1989 | Selby . |

FOREIGN PATENT DOCUMENTS 6-241302  8/1994  Japan ........................................ 74/524

OTHER PUBLICATIONS

Sketch to Volvo Trucks Corporation' European design.

*Primary Examiner*—Tamara L. Graysay
*Assistant Examiner*—Colby Hansen
*Attorney, Agent, or Firm*—Watts, Hoffmann, Fisher & Heinke

[57] ABSTRACT

An over-the-highway truck or tractor equipped with a gear shift lever selectively foldable from an operating position to a folded position is disclosed. The gear shift lever includes upper and lower lever portions relatively telescopically and rotatably connected. The upper lever portion includes a generally L-shaped slot, while the lower lever portion carries a pin slidably engageable with and guided by the L-shaped slot for relative guiding movement of the lever portions. A tapered leg of the slot is arranged to allow relatively telescopic and pivotal movement between the lever portions and a foot of the slot extends laterally from the leg. The foot allows relatively rotatable movement between the lever portions to engage the pin and foot in the operating position. A coil spring urges the lever portions apart so that when the pin is within the leg the lever portions are relatively moveable axially. When the pin is within the leg the spring urges the first and second lever portions apart a predetermined distance. When the pin is positioned near an end of the leg remote from the foot, the portions are relatively pivotable between the aligned and out of the way lever portions.

18 Claims, 5 Drawing Sheets

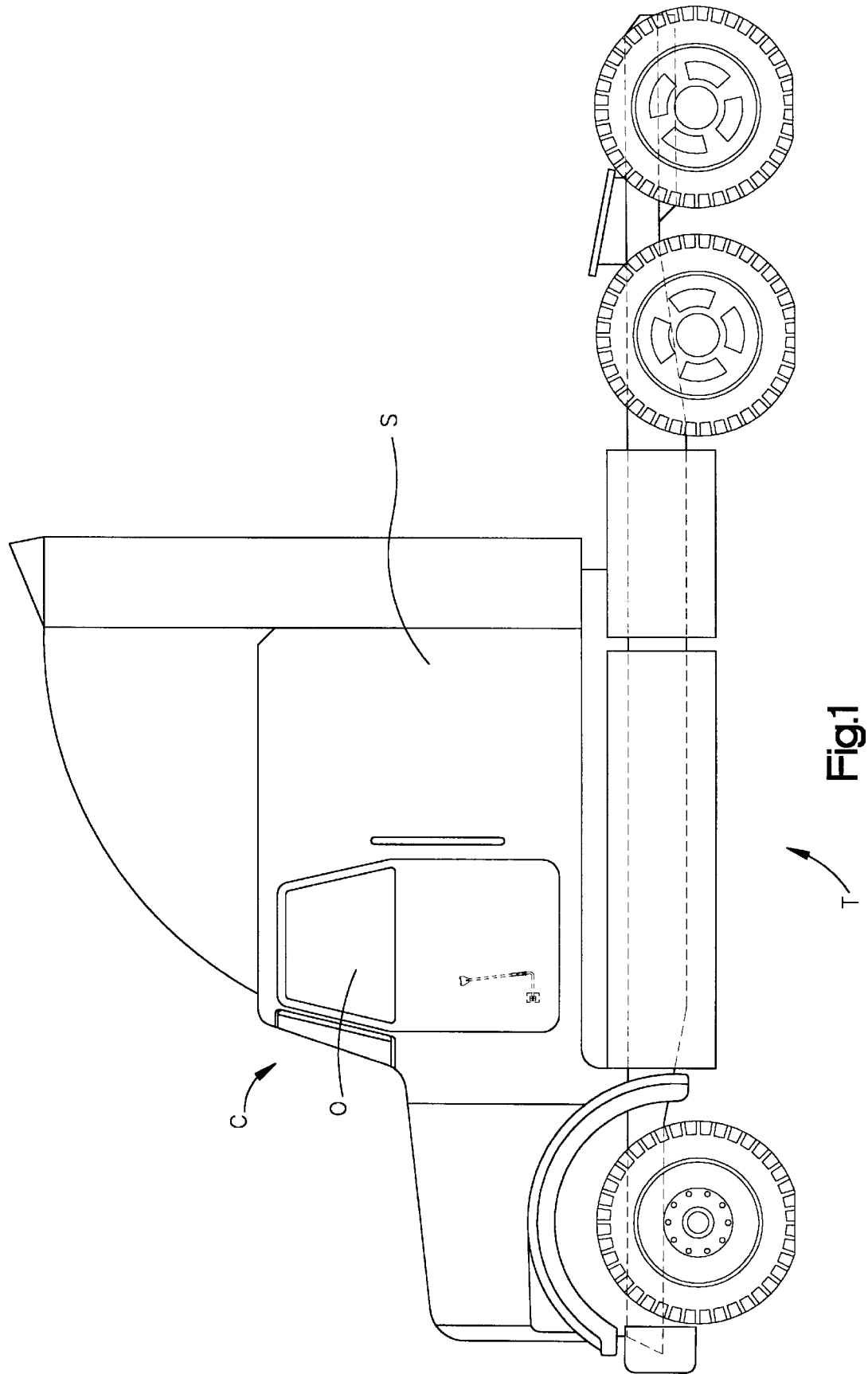

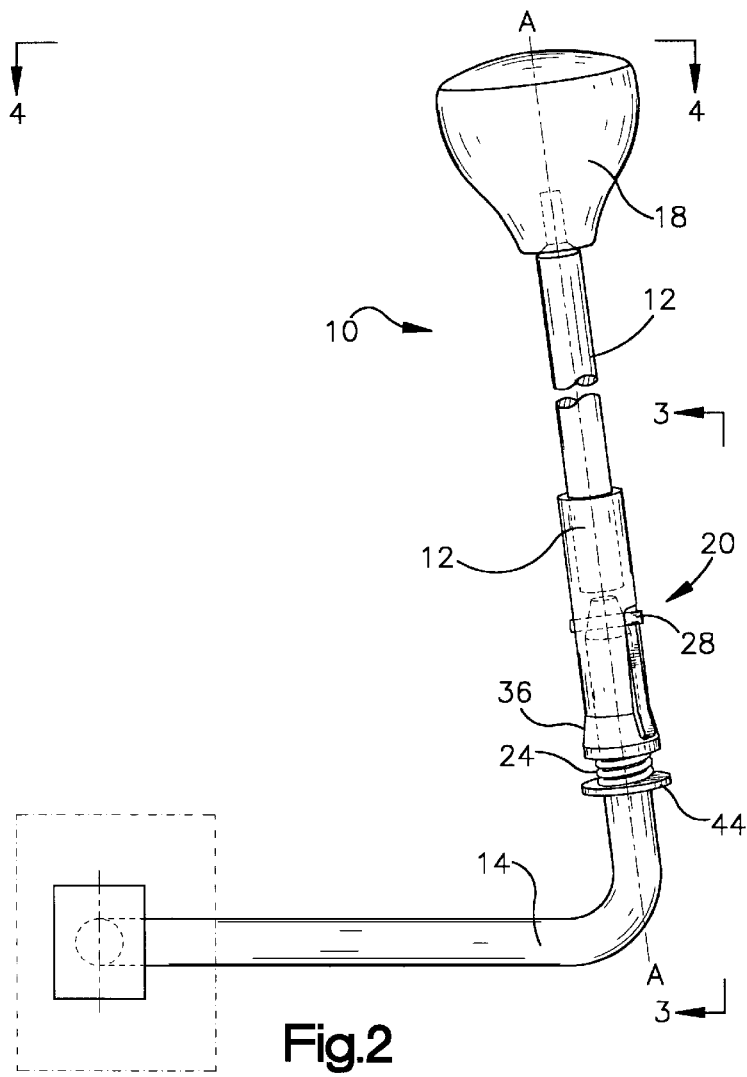
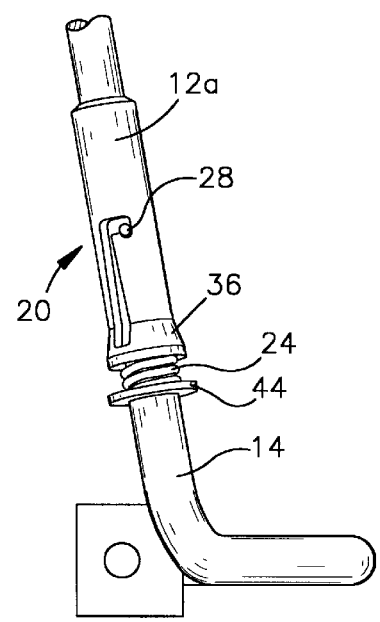
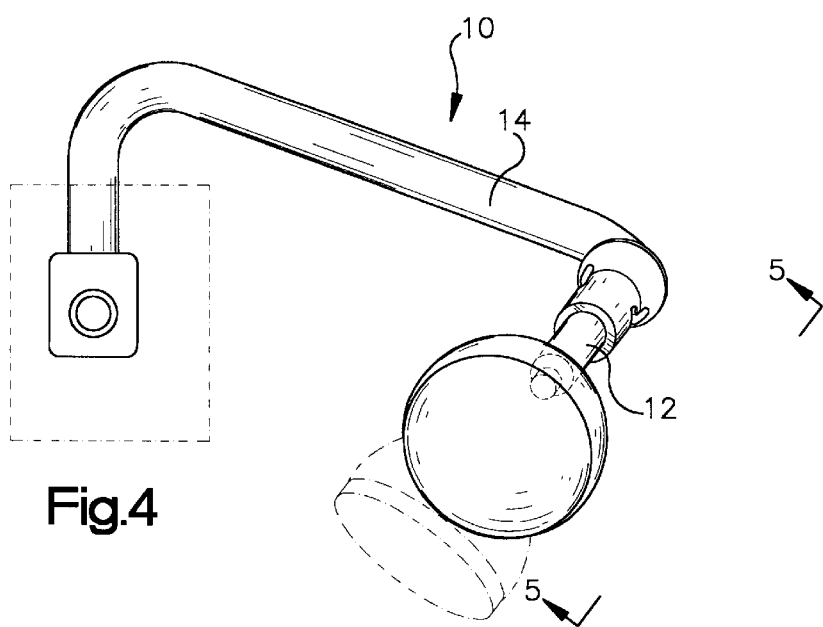

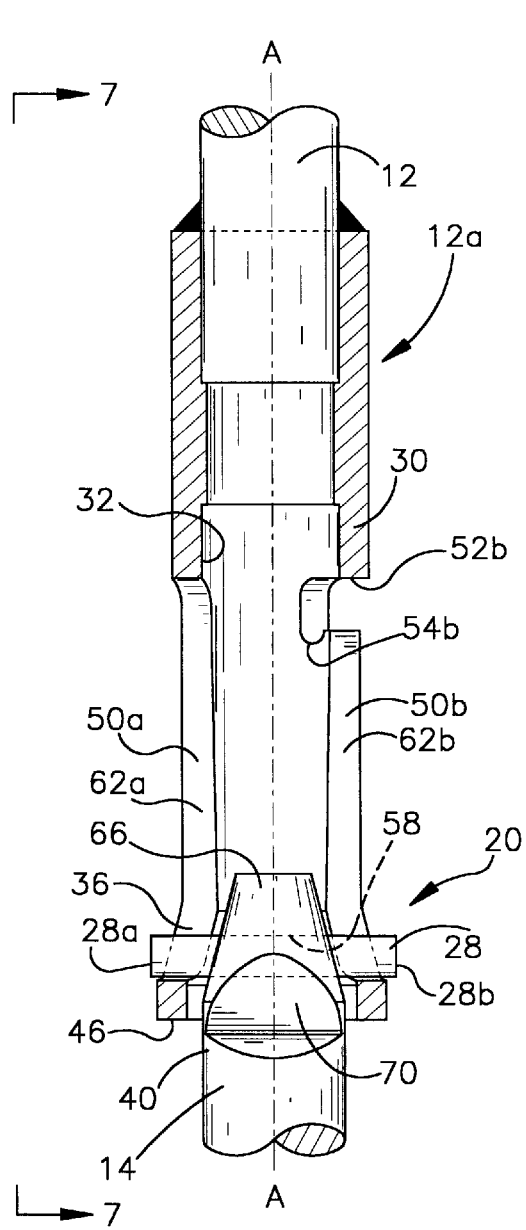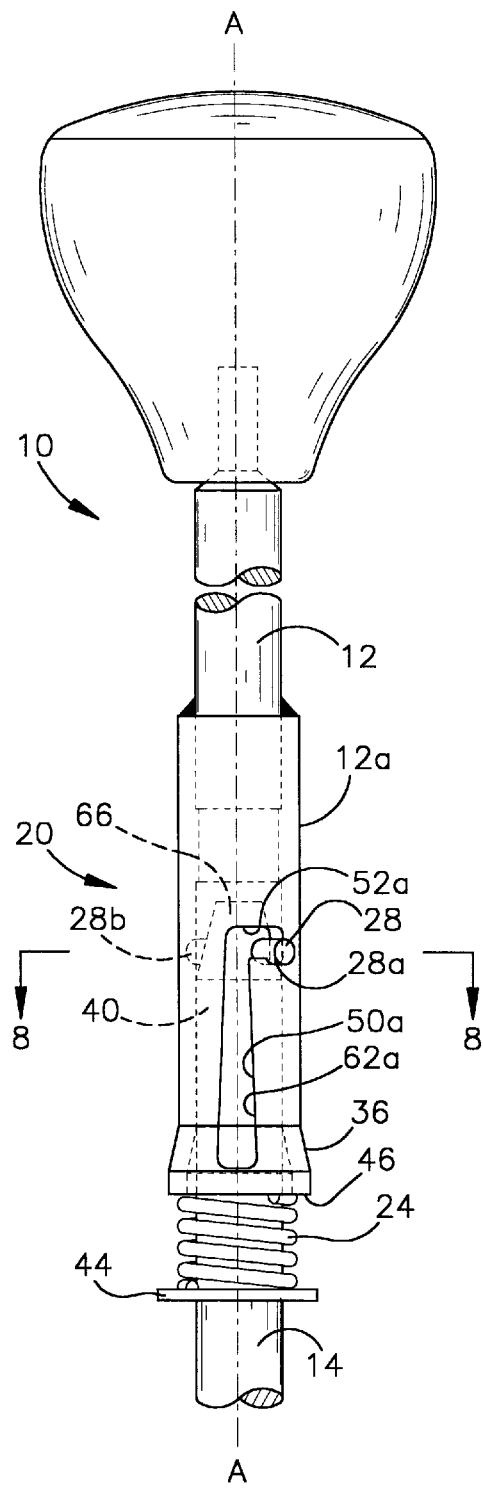
Fig.5
Fig.6

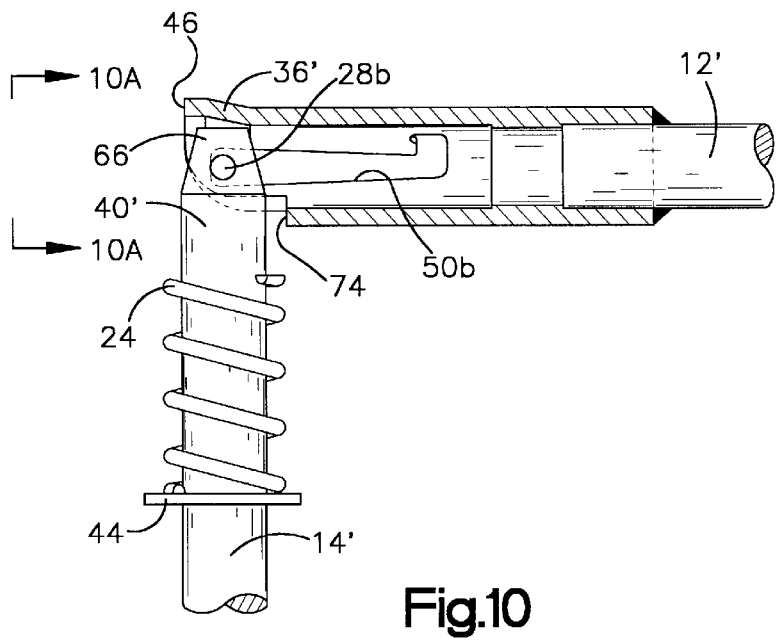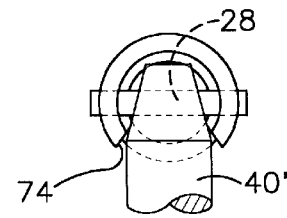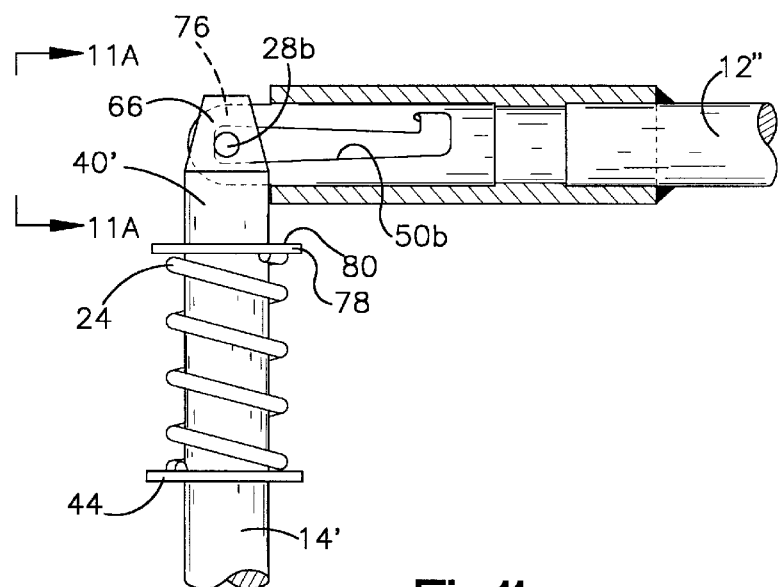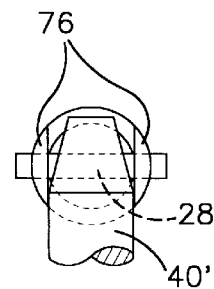

HIGHWAY TRACTOR GEAR SHIFT

FIELD OF THE INVENTION

The present invention relates to over-the-highway trucks and tractors and more particularly to highway tractors with sleeper cabs each equipped with a foldable gear shift lever.

BACKGROUND OF THE INVENTION

Over-the-highway tractors equipped with sleeper accommodations have come into wide usage. Typically such a tractor includes a relatively large cab having driver and passenger seats in a forward portion and sleeping accommodations to the rear.

When an operator wishes to rest within a sleeper cab, it is desirable to be able to move easily about the entire cab interior to move, for example from the driver's seat to the sleeping space behind the seats or from the sleeping space past either seat to exit the vehicle.

In a typical sleeper, the gear shift lever is an obstruction to such free movement throughout the cab. The gear shift lever is located between forward portions of the operator and passenger seats for ready access by the operator. While the lever is so positioned for ease of operation of the vehicle, it's location interferes with movement in the cab when the vehicle is at rest.

Proposals have been made for foldable gear shift levers that are intended to be moved out of the way when the vehicle is at rest. All such prior proposals have, however, had drawbacks. The drawbacks include difficulties in moving lever components relatively between operating and storage positions because the components tend to bind. Prior proposals also suffered from undue complexity of the lever systems, and attendant excessive costs.

Accordingly, it would be desirable to provide a gear shift lever that can be selectively moved between an operating position and a stowed position, cost effective to manufacture, and capable of handling the stresses to which gear shift levers are subjected in use.

SUMMARY OF THE INVENTION

A reason for the difficulties in moving lever portions relatively to change from an operating position to a pivoted or stored position has been discovered. The reason is that operators tend to apply downward force to the lever essentially vertically while the lever itself is not vertical. Thus where two lever portions are intended to be telescopically collapsed, the force applied by the operator tends to cock an upper portion relative to the lower portion resulting in binding and difficulty in relatively moving the portions.

The present invention provides a new and improved gear shift lever that is selectively and facilely movable between an operating position and a folded or storage position. The gear shift lever includes upper and lower lever portions that are relatively telescopically and rotatably connected. The upper portion defines a generally L-shaped slot having a leg and a foot. The lower portion carries a pin, or other similar pin means, that slidably engages and is guided by the L-shaped slot which, in turn, guides relative movement of the lever portions. The leg of the slot is arranged to allow relative telescopic and pivotable movement between the lever portions. In one embodiment, the leg of the slot is oriented generally parallel to an axis defined by the lower lever portion. The foot extends laterally from the leg and is arranged to allow relatively rotatable movement between the lever portions.

One of the outstanding features of the present invention resides in the configuration of the slot leg which alleviates the tendency of the lever portions to bind as they are moved into their operating positions. In the disclosed embodiment, each leg is tapered from a relatively wide dimension at its lower end to its narrowest transverse dimension at the juncture of the leg with the foot. This taper enables each of two pin ends to move freely in the leg of an associated one of two slots without tending to create excess friction from engagement between the pin ends and sides of the legs as the upper lever portion is compressed downwardly against the action of a coil spring.

The coil spring, or other similar biasing means, telescopically urges the lever portions apart. When the pin is aligned within a detent in the foot the pin frictionally engages the foot via the force exerted by the coil spring. As a result, relative rotatable or telescopic movement between the lever portions is substantially inhibited. When the pin is aligned within the leg the coil spring urges the lever portions apart a predetermined distance to allow relative lever portion movement to a pivot position to allow relative pivotable movement between the lever portions. The lever portions are formed to allow pivoting to place the lever portions in an out of the way storage position.

According to one embodiment of the invention, the upper portion includes a collar member that defines an inner bore therethrough and the lower portion includes an upper section that is complemental with and slidably engageable in the inner bore. The upper section is surrounded by the coil spring and includes an end part that carries the pin. An annular retainer spaced apart from the pin supports the spring. The collar member defines a bearing surface engageable by the coil spring. The coil spring is disposed between the bearing surface and the annular retainer.

According to a feature of the invention, detent is spaced from the leg and arranged so that when the upper lever portion is rotated through a predetermined arc relative to the lower lever portion the pin aligns with and is forced into the detent via the force exerted by the coil spring. When the pin engages the detent the pin substantially inhibits relative movement between the lever portions.

According to another feature of the invention, the upper lever portion defines an oppositely-positioned L-shaped slot circumferentially spaced about 180 degrees from the above-mentioned generally L-shaped slot. To facilitate the two L-shaped slots, the pin is disposed in a transverse through-bore in the upper section and the pin includes spaced ends that are in the spaced slots.

According to yet another feature of the invention, pivot enabling formations are provided. The formations include a tapered opening in the lower section of the upper portion and the upper section of the lower portion including a tapered end part corresponding with the tapered opening. The tapered opening and end part are sized to form a gap therebetween for providing clearance when the lever portions are pivoted relatively. The end part also defines a recess for providing clearance for the tapered end when the upper lever portion is pivoted to a folded position. The recess forms a stop mechanism that prevents pivotable movement of the upper portion beyond a predetermined pivot angle. In one embodiment the predetermined pivot angle is about 30 degrees.

BRIEF DESCRIPTION OF THE DRAWINGS

FIG. 1 is an elevational view of an over-the-highway tractor equipped with the gear shift lever of the present invention.

FIG. 2 is an elevational view of a foldable gear shift lever constructed in accordance with the present invention;

FIG. 3 is a foreshortened view of the gear shift lever as seen from the plane indicated by the line 3—3 of FIG. 2;

FIG. 4 is a plan view of the gear shift of FIG. 2 showing in phantom lines an operating position and in solid lines a folded or storage position;

FIG. 5 is a sectional view of a portion of the shift lever as seen from the plane indicated by the line 5—5 of FIG. 2;

FIG. 6 is a foreshortened elevational view of the gear shift lever as seen from a plane rotated slightly from the plane indicated by the line 3—3 of FIG. 2;

FIG. 10 is a sectional view of an alternate embodiment of the lever of the present invention;

FIG. 10A is a fragmentary elevational view of the embodiment of FIG. 10 as viewed from the plane indicated by the line 10A—10A of FIG. 10;

FIG. 11 is a sectional view of another alternative embodiment of the lever of the present invention; and FIG. 11A is a fragmentary elevational view of the embodiment of FIG. 11 as seen from the plane indicated by the line 11A—11A of FIG. 11.

DETAILED DESCRIPTION OF THE PREFERRED EMBODIMENTS

Figure 7:
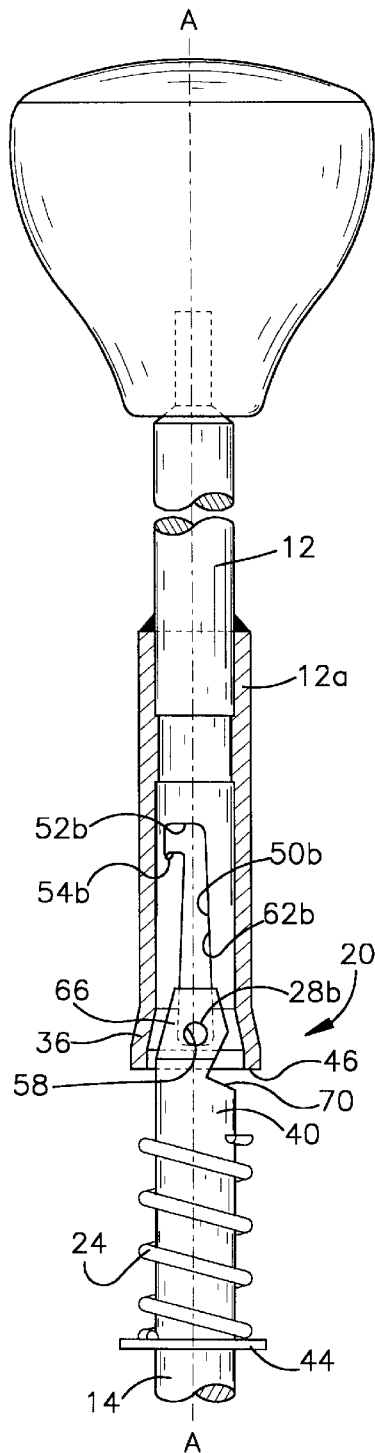
FIG. 7 is a partially sectioned view of the lever in its released and lifted position.

Referring now to the drawings, FIG. 1 shows a highway tractor T of the sleeper type. The tractor T is equipped with an operator cab C. The cab includes the usual forward operating section O and a sleeper section S in a rearward portion of the cab. A gear shift lever 10 constructed in accordance with the present invention is mounted in the operating section O and positioned for ready access by an operator.

Referring to FIGS. 2–9, the gear shift lever 10 includes an upper lever portion in the form of a sleeve 12 and a lower lever portion in the form of a rod 14. The lower portion 14 is connected to a transmission or other mechanism requiring a shifting function. A gear shift knob 18 is located at the upper end of the upper lever portion 12 for operator operation of the shift lever 10. A collar member or sleeve 12a forms a lower end section of the upper portion 12.

The lever portions 12, 14 are coupled together via a pin-slot arrangement generally indicated at reference character 20. The lever portions are relatively axially biased by a coil spring 24 around the lower portion 14. The spring 24 acts between the sleeve 12a and a shoulder 25 around the lower portion 14.

FIGS. 2 and 3 show the gear shift lever 10 in an operating or locked position wherein the upper and lower lever portions 12, 14 are axially aligned and substantially fixedly interconnected. To reposition the gear shift lever 10 to a folded or out-of-the-way position, as shown in FIG. 4, the upper lever portion 12 is pushed axially downwardly, rotated counterclockwise about an axis A-A (shown in FIG. 2), released, lifted axially upwardly and then pivoted about a cross pin 28 carried by the lower portion 14, FIG. 9.

Referring to FIG. 5, the collar member 30 includes a throughbore 32 coaxial with the axis A-A when in the operating position. The collar member 30 also includes a tapered end section 36 located at the lower end of the upper lever portion 12. The lower lever portion 14 includes an extension 40 which is axially aligned with the axis A-A when the lever is in the operating position of FIGS. 2 and 3. The extension 40 is slidably receivable in the complemental bore 32 to position the shift lever in its operating position.

Referring to FIG. 6, the shoulder 25 is defined by an annular retainer 44 which retains the coil spring 24 against an end surface 46 on the tapered end section 36. The annular retainer 44 is maintained in its position shown in FIG. 5 by means of a snap ring (not shown) in a groove in the lower lever portion 14 immediately below the retainer 44. As can be seen in FIG. 6, when the gear shift lever 10 is in its operating position the spring 24 is in a compressed state biasing the upper lever portion 12 axially upwardly. When the lever is in the operating position, the pin-slot arrangement 20 and the coil spring 24 cooperate to substantially inhibit telescopic and rotatable relative movement between the lever portions 12, 14.

Figure 8:
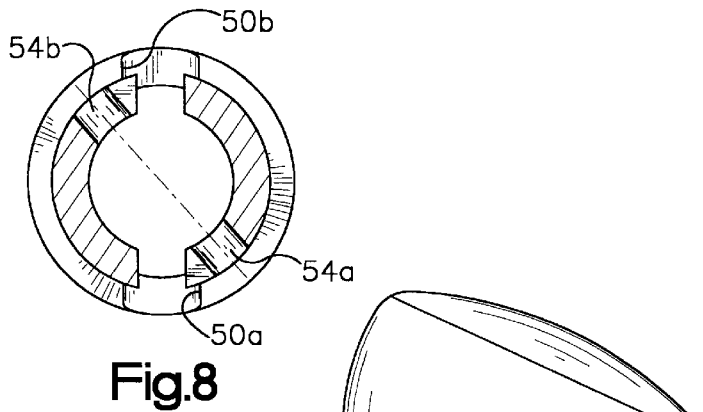
FIG. 8 is a sectional view as seen from the plane indicated by the line 8—8 of FIG. 6.

As shown in FIGS. 6 through 8, the upper lever portion 12 defines a pair of slots 50a, 50b located 180 degrees apart and each having a generally inverted "L" shape. The L-shaped slots 50a, 50b include short lateral foot segments 52a, 52b and longer, longitudinally extending leg segments 62a, 62b, respectively. The cross pin 28 is disposed in a transverse through-bore 58 located in the lower lever portion 14. The pin 28 is positioned such that its end portions 28a, 28b respectively are projections disposed into slots 50a, 50b. The pin ends and slots cooperate to guide and limit relative movement of the lever portions 12,14.

The pin ends 28a, 28b are engageable with the structure forming the foot segments 52a, 52b to inhibit relative axial movement between the lever portions 12, 14. In the preferred embodiment illustrated in FIGS. 2–9, rotational movement is resisted by detents 54a, 54b respectively formed in the foot segments 52a, 52b. The detents 54a, 54b are appropriately sized to receive and retain the ends 28a, 28b of the cross pin 28. As can be seen in FIG. 5, the ends 28a, 28b are held in the detents 54a, 54b via the force exerted by the coil spring 24 on the bearing surface 46. This locking action maintains a substantially fixed connection between the upper and lower lever portions 12, 14.

Figure 9:
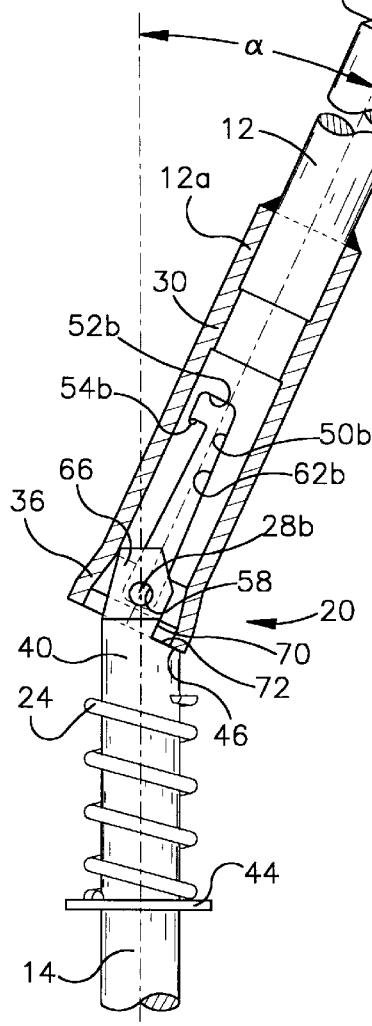
FIG. 9 is a view corresponding to FIG. 7 with the upper lever portion pivoted relative to the lower lever portion.

By pushing the upper lever portion 12 downwardly against the bias of the spring 24, an operator will disengage the cross pin 28 from the detents 54a, 54b. Once the pin is disengaged the operator can rotate the upper lever portion 12 counterclockwise to align the cross pin 28 with the legs 62a, 62b. This allows relative sliding movement, between the upper and lower lever portions 12, 14 along the axis A-A as the spring 24 pushes the upper lever portion a predetermined distance upwardly until the spring 24 is substantially uncompressed. According to a preferred embodiment this predetermined distance is equivalent to about one-half of the distance from the top to the bottom of the elongated slots 50a, 50b. The upper lever portion 12 can then be lifted the remaining distance to thereby position the pin 28 at the bottom of the elongated slot 50a, 50b (as shown in FIG. 7) to place the lever portions in a pivot position. The upper lever portion 12 is then free to be pivoted about the cross pin 28 into an out-of-the-way folded position, as shown in FIG. 9.

The extension 40 of the lower lever portion 14 includes a tapered upper end section 66 which has a taper corresponding to the tapered section 36. Consequently, lifting the upper lever portion 12 creates a circumferential gap between the upper and lower lever portions 12, 14 (see FIG. 6). The gap provides clearance for the tapered end section 36 to facilitate pivoting of the upper lever portion 12 about the cross pin 28.

As shown in FIG. 5, the lower lever portion 14 includes a recess 70 defined by surfaces which are in planes that are substantially parallel to the cross pin 28. The recess 70 provides clearance for the tapered section 36 when the upper lever portion 12 is pivoted to the folded position, shown in FIG. 9.

The recess 70 also has a surface which functions as a stop mechanism 72. A portion of the bearing surface 46 abuts the stop mechanism 72 when the lever is in its folded position. This abutment prevents pivotable movement of the upper lever portion 12 beyond a predetermined pivot angle, alpha, relative to the lower lever portion 14.

In the preferred embodiment, the predetermined pivot angle is approximately 30 degrees. The pivot angle can be adapted to meet the particular requirements of a given cab by changing the geometry of the tapered end sections 36, 66 and the recess 70. For example, in the alternate embodiment shown in FIGS. 10 and 10A, the tapered end section 36' includes a cut out section 74 having a sufficient width to receive the lower portion 14' and provides a 90° folded position as shown in FIGS. 10 and 10A.

FIGS. 11 and 11A show another alternate embodiment wherein the upper lever portion 12" includes a double-forked end 76 and the lower lever portion 14' carries a surrounding annular bearing 78. The annular bearing 78 is relatively slidable axially of the extension 40' and provides a bearing surface 80 for engagement by the double-forked end 76 when the lever portions are in their operating positions. Here the pivot angle is also about 90 degrees.

When an operator wishes to move any of the three embodiments from its out of the way or storage position to its operating position, the upper lever portion is first pivoted back to anally aligned position relative to the lower portion as shown in FIGS. 5 and 7. The upper portion must now be depressed against the bias of the spring 24 and once the pin 28 is aligned with the feet of the slots, rotated until the pin ends are aligned with the detents 54a,54b. One of the outstanding features of the invention resides in providing slot legs whose sides are delineated by upwardly converging, tapered walls. Thus, the slot legs narrow from widest portions at their bases to narrowest portions at the juncture of the legs with their respective feet. The provision of these tapering slots has been found to substantially eliminate the tendency of the lever portions to bind as they are relatively moved axially into the operating position.

While the present invention has been described with a certain degree of particularity, it will be understood by those skilled in the art that various changes and modifications may be made without departing from the scope of the invention as defined by the claims hereinafter set forth.

We claim:

1. A shift lever selectively movable from an operating position to a folded position comprising:
   a) a first lever portion;
   b) a second lever portion telescopically and relatively rotatably connected to said first lever portion, the second portion including a generally L-shaped slot having leg and foot parts;
   c) said first portion having at least one lateral projection disposed within the slot, the projection being guidable by said slot to provide guided relative movement of said lever portions;
   d) the leg part being arranged to allow relatively telescopic and pivotable movement between said lever portions and the foot part extending laterally from the leg part and being arranged to allow relatively rotatable movement between said lever portions;
   e) biasing means for telescopically urging apart said first and second lever portions so that when said projection is aligned within said foot part said projection engages said foot part under force exerted by said biasing means whereby to substantially inhibit relative movement between said lever portions, when said projection is within said leg part said biasing means urges said lever portions apart a predetermined distance to thereby allow relative pivotable movement between said lever portions; and
   f) the leg part being tapered between a relatively narrow width adjacent the foot part to a wider width at a leg part end remote from the foot.

2. The shift lever of claim 1, wherein said second lever portion includes a sleeve having an inner bore and said first lever portion includes an extension that projects into said bore when the lever is in its operating position.

3. The shift lever of claim 2, wherein said extension is surrounded by said biasing means and further includes an end part that carries said projection and a retainer spaced apart from said projection for engaging said biasing means.

4. The gear shift lever of claim 3, wherein said sleeve defines a bearing surface engageable by said biasing means, said biasing means being disposed between said bearing surface and said retainer.

5. The gear shift lever of claim 1, wherein said leg part is oriented generally parallel to an axis defined by the centerline of said second lever portion.

6. The gear shift lever of claim 1, wherein said foot part further defines a laterally extending detent that is arranged so that when said second lever portion is rotated a predetermined angle relative to said first lever portion said projection aligns with said detent and is forced into said detent by said biasing means, said projection being operative to substantially inhibit relative movement between said first and second lever portions when said projection engages said detent.

7. The gear shift lever of claim 1, wherein said second lever portion defines an oppositely-positioned L-shaped slot circumferentially spaced about 180 degrees from said generally L-shaped slot.

8. The gear shift lever of claim 7, wherein said projection is a cross pin disposed in a through-bore transverse to a portion of said first lever portion, said cross pin having projecting end portions disposed in said respective L-shaped slots.

9. The gear shift lever of claim 1, further including pivot enabling means including said second lever portion having a tapered opening and said first lever portion having a projecting portion having a tapered end part corresponding with said tapered opening, the tapered opening and tapered end part being sized to form a gap therebetween for providing clearance when said second lever portion is pivoted relative to said first lever portion.

10. The gear shift lever of claim 9, wherein said projecting portion defines a recess for providing clearance for the tapered end part when said second lever portion is pivoted to a folded position.

11. The gear shift lever of claim 10, wherein said recess includes a stop mechanism that prevents pivotable movement of the second lever portion beyond a predetermined pivot angle relative to the first lever portion.

12. The gear shift lever of claim 11, wherein said predetermined pivot angle is about 30 degrees.

13. A gear shift lever selectively movable between operating and folded positions, the lever comprising:
   a) first and second telescopically connected lever portions;
   b) pin means carried by said first lever portion for guided movement in a generally L-shaped slot formed in said second lever portion; said pin means and said slot being arranged to allow relative rotatable movement between said first and second lever portions when said pin means is positioned within a foot of the slot, the portions being relatively movable telescopically when said pin means is positioned within a leg of the slot, and the portions being relatively pivotable when said pin means is positioned at a predetermined location within said leg; and
   c) biasing means disposed between said lever portions for urging said lever portions apart; said biasing means being operative when said pin means is within said foot to assist in providing substantially fixedly interconnection between said lever portions, and when said pin means is within said leg to push said lever portions apart a predetermined distance until said biasing means attains a substantially uncompressed state.

14. A gear shift lever for use in an over-the-highway tractor comprising:
   a) a pair of lever portions which are relatively moveable from an operating position to a pivot position to a storage position and return;
   b) one of the portions having a tubular end section;
   c) the other of the portions having a rod end section complementally and telescopically receivable within the tubular section;
   d) said tubular section including a L-shaped slot with an axially disposed leg and a communicating circumferentially disposed foot;
   e) the rod section including a position locating projection extending into the slot;
   f) a spring interposed between the portions and biasing the portions apart;
   g) the foot including a detent near its end for coaction with the projection under biasing force of the spring to maintain the portions in the operating position;
   h) the portions being moveable from the operating position to the pivot position through the operator application of axial and rotative forces to shift the projection away from the detent through the foot into the leg followed by relative axial movement of the portions until the portions are in the pivot position with the projection located near an end of the leg remote from the foot; and,
   i) the portions when in the pivoted position being pivotal from an axially aligned relationship to the storage position wherein the portions' axes are at a predetermined angle with one another greater than zero degrees.

15. The shift lever of claim 14, wherein said tubular section includes two diametrically opposed slots and said rod section includes two projections respectively disposed in the slots.

16. The shift lever of claim 15, wherein the projections are provided by a pin disposed in a throughbore in said rod section.

17. The shift lever of claim 14, wherein the projection is provided by a pin disposed in a radial bore in said rod section.

18. The shift lever of claim 14, wherein a retainer is carried by said rod section and the spring is interposed between the retainer and said tubular section.

* * * * *